(12) United States Patent
Kao

(10) Patent No.: US 9,186,790 B1
(45) Date of Patent: Nov. 17, 2015

(54) SLEEVE BRACKET ASSEMBLY

(71) Applicant: Jui-Chien Kao, Taichung (TW)

(72) Inventor: Jui-Chien Kao, Taichung (TW)

( * ) Notice: Subject to any disclaimer, the term of this patent is extended or adjusted under 35 U.S.C. 154(b) by 1 day.

(21) Appl. No.: 14/306,105

(22) Filed: Jun. 16, 2014

(30) Foreign Application Priority Data

May 20, 2014 (TW) .............................. 103117603 A

(51) Int. Cl.
*B65D 85/28* (2006.01)
*B25H 3/00* (2006.01)

(52) U.S. Cl.
CPC ...................................... *B25H 3/003* (2013.01)

(58) Field of Classification Search
CPC .................................. B25H 3/003; B25H 3/04
USPC .......... 206/378, 376, 372, 373, 349; 211/70.6
See application file for complete search history.

(56) References Cited

U.S. PATENT DOCUMENTS

| | | | | |
|---|---|---|---|---|
| 4,826,021 | A * | 5/1989 | Burrell | 211/70.6 |
| 5,228,570 | A | 7/1993 | Robinson | |
| 5,398,823 | A * | 3/1995 | Anders | 211/70.6 |
| 5,501,342 | A * | 3/1996 | Geibel | 206/378 |
| 6,070,745 | A * | 6/2000 | Dembicks | 211/70.6 |
| 6,386,363 | B1 * | 5/2002 | Huang | 206/378 |
| 6,431,373 | B1 * | 8/2002 | Blick | 211/70.6 |
| 6,488,151 | B2 | 12/2002 | Ramsey | |
| 7,658,284 | B2 | 2/2010 | Lin | |
| 7,841,480 | B2 * | 11/2010 | Hsieh | 211/70.6 |
| 8,517,188 | B2 * | 8/2013 | Kao | 211/70.6 |
| 2011/0089126 | A1 * | 4/2011 | Hsieh | 211/70.6 |

FOREIGN PATENT DOCUMENTS

| | | |
|---|---|---|
| CN | 2317056 Y | 5/1999 |
| CN | 202357149 | 8/2012 |
| TW | I343306 | 6/2011 |
| TW | I343307 | 6/2011 |
| TW | I395646 | 5/2013 |
| TW | I395647 | 5/2013 |
| TW | 201331000 | 8/2013 |
| TW | I404658 | 8/2013 |
| TW | I409150 | 9/2013 |

OTHER PUBLICATIONS

Substantive examination and Search Report from TIPO.

* cited by examiner

*Primary Examiner* — Jacob K Ackun
*Assistant Examiner* — Jenine Pagan
(74) *Attorney, Agent, or Firm* — Apex Juris, pllc; Tracy M. Heims

(57) ABSTRACT

A sleeve bracket assembly has a track-base, a positioning-board and multiple positioning-mounts. The track-base has a bottom panel, a slide-rail and a connecting track. The slide-rail and the connecting track are respectively formed on a top surface of the bottom panel and a bottom surface of the bottom panel. The positioning-board is elastic, is mounted in the connecting track and has two rail-bars and a positioning-rack. The positioning-mounts are movably and rotatably mounted on the track-base, engage the positioning-board and each one of the positioning-mounts has a sliding-engaging seat and an inserting-button. The sliding-engaging seat is movably mounted in the slide-rail, engages the positioning-board and has at least three engaging-teeth selectively engaging the positioning-rack. The inserting-button is formed on the sliding-engaging seat.

8 Claims, 7 Drawing Sheets

SLEEVE BRACKET ASSEMBLY

BACKGROUND OF THE INVENTION

1. Field of the Invention

The present invention relates to a sleeve bracket assembly, and more particularly to a sleeve bracket assembly that can allow sleeves to be rotated relative to the sleeve bracket assembly and also can position the sleeves securely on the sleeve bracket assembly.

2. Description of Related Art

A conventional sleeve bracket assembly has a track-base and multiple sleeve mounts. The track-base has a top and a slide-rail. The slide-rail is formed in the top of the track-base. The positioning-mounts are movably mounted in the slide-rail of the track-base. Each one of the sleeve mounts has a sliding seat and an inserting-button. The sliding seat is rectangular and is movably mounted in the slide-rail of the track-base and has a top surface. The inserting-button is round, is formed on and protrudes from the top surface of the sliding seat and extends out of the slide-rail.

In use, sleeves are mounted around the inserting-buttons of the positioning-mounts, and the round inserting-buttons can allow the sleeves to rotate to enable numbers or signs on the sleeves to face a user. However, the inserting-buttons lack positioning structures and cannot securely hold on the sleeves. Then, the positions and the angles of the numbers or signs on the sleeves may easily change when the sleeves or the conventional sleeve bracket are hit by other objects, and the user needs to rotate the sleeves relative to the inserting-buttons to adjust the positions and the angles of the numbers or signs of the sleeves and this is inconvenient in use.

In addition, a positioning mount of another conventional sleeve bracket assembly has a round sliding seat and a rectangular inserting-button. The sleeves can be firmly positioned on the rectangular inserting-buttons and cannot be rotated relative to the slide-rail, and the user can rotate the round slide seats relative to the slide-rail to adjust the positions and the angles of the numbers or signs on the sleeves to face the user. However, the round slide seats lack positioning structures and cannot securely mounted in the slide-rail of the track-base. Then, the positions and the angles of the numbers or signs on the sleeves may easily change when the sleeves or the conventional sleeve bracket are hit by other objects, and the user still needs to rotate the sleeves to adjust the positions and the angles of the numbers or signs of the sleeves and this is also inconvenient in use.

To overcome the shortcomings, the present invention tends to provide a sleeve bracket assembly to mitigate the aforementioned problems.

SUMMARY OF THE INVENTION

The main objective of the invention is to provide a sleeve bracket assembly that can allow sleeves to be rotated relative to the sleeve bracket assembly and also can position the sleeves securely on the sleeve bracket assembly.

A sleeve bracket assembly in accordance with the present invention has a track-base, a positioning-board and multiple positioning-mounts. The track-base has a bottom panel, a slide-rail and a connecting track. The slide-rail and the connecting track are respectively formed on a top surface of the bottom panel and a bottom surface of the bottom panel. The positioning-board is elastic, is mounted in the connecting track and has two rail-bars and a positioning-rack. The positioning-mounts are movably and rotatably mounted on the track-base, engage the positioning-board and each one of the positioning-mounts has a sliding-engaging seat and an inserting-button. The sliding-engaging seat is movably mounted in the slide-rail, engages the positioning-board and has at least three engaging-teeth selectively engaging the positioning-rack. The inserting-button is formed on the sliding-engaging seat.

Other objects, advantages and novel features of the invention will become more apparent from the following detailed description when taken in conjunction with the accompanying drawings.

DETAILED DESCRIPTION OF PREFERRED EMBODIMENT

Figure 1:
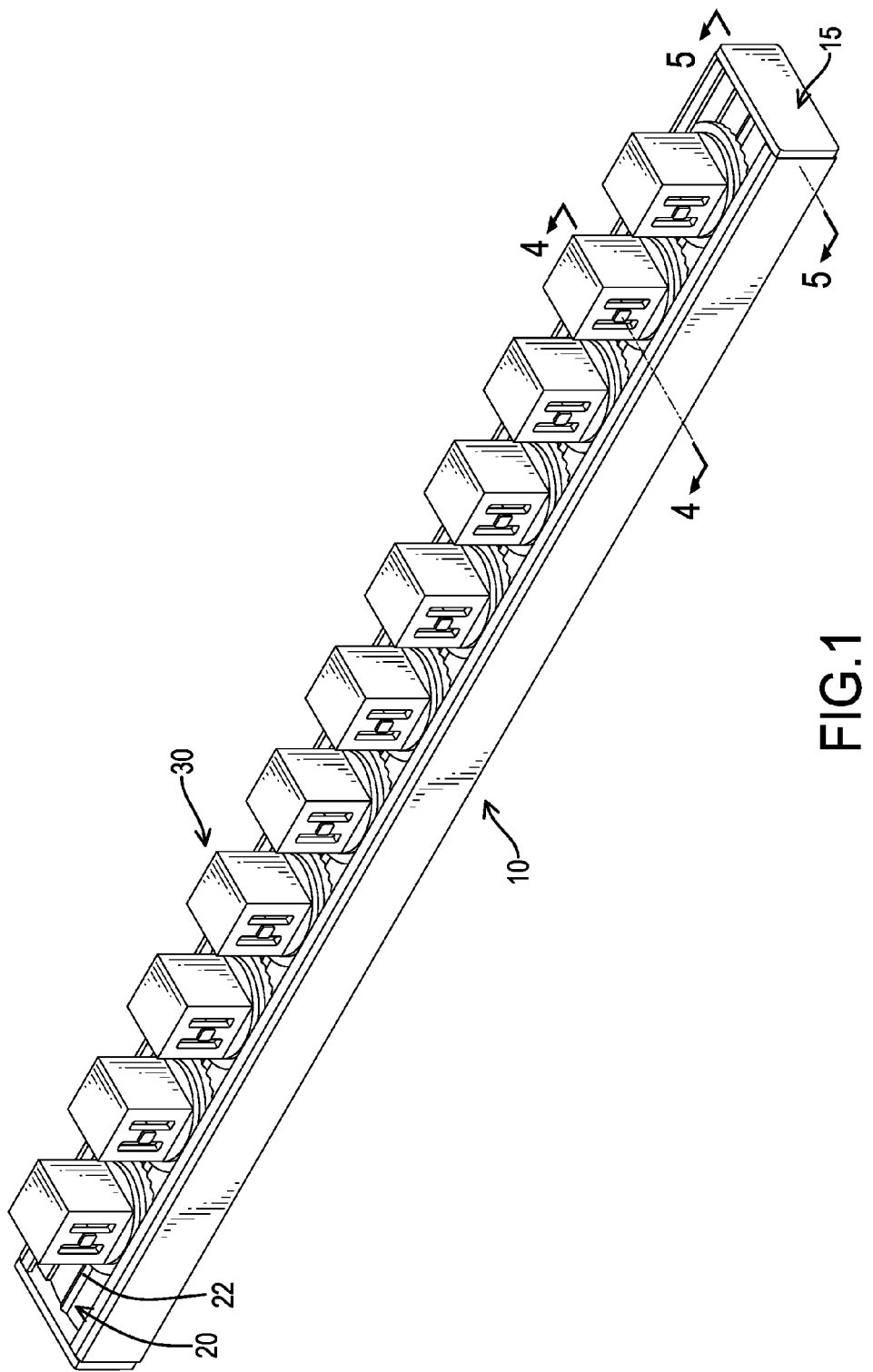
FIG. 1 is a perspective view of a sleeve bracket assembly in accordance with the present invention.
Figure 2:
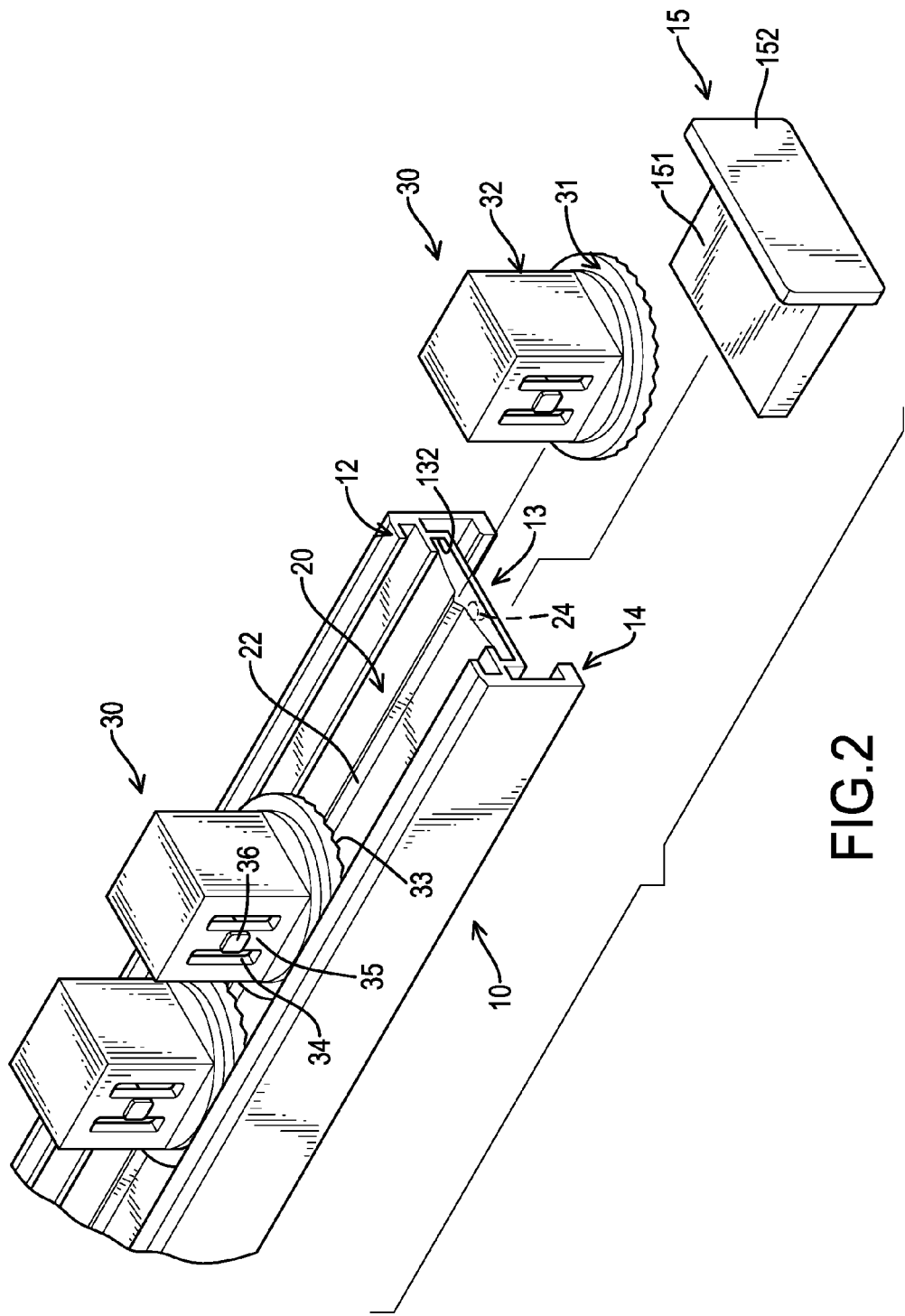
FIG. 2 is a partially enlarged and exploded perspective view of the sleeve bracket assembly in FIG. 1.
Figure 3:
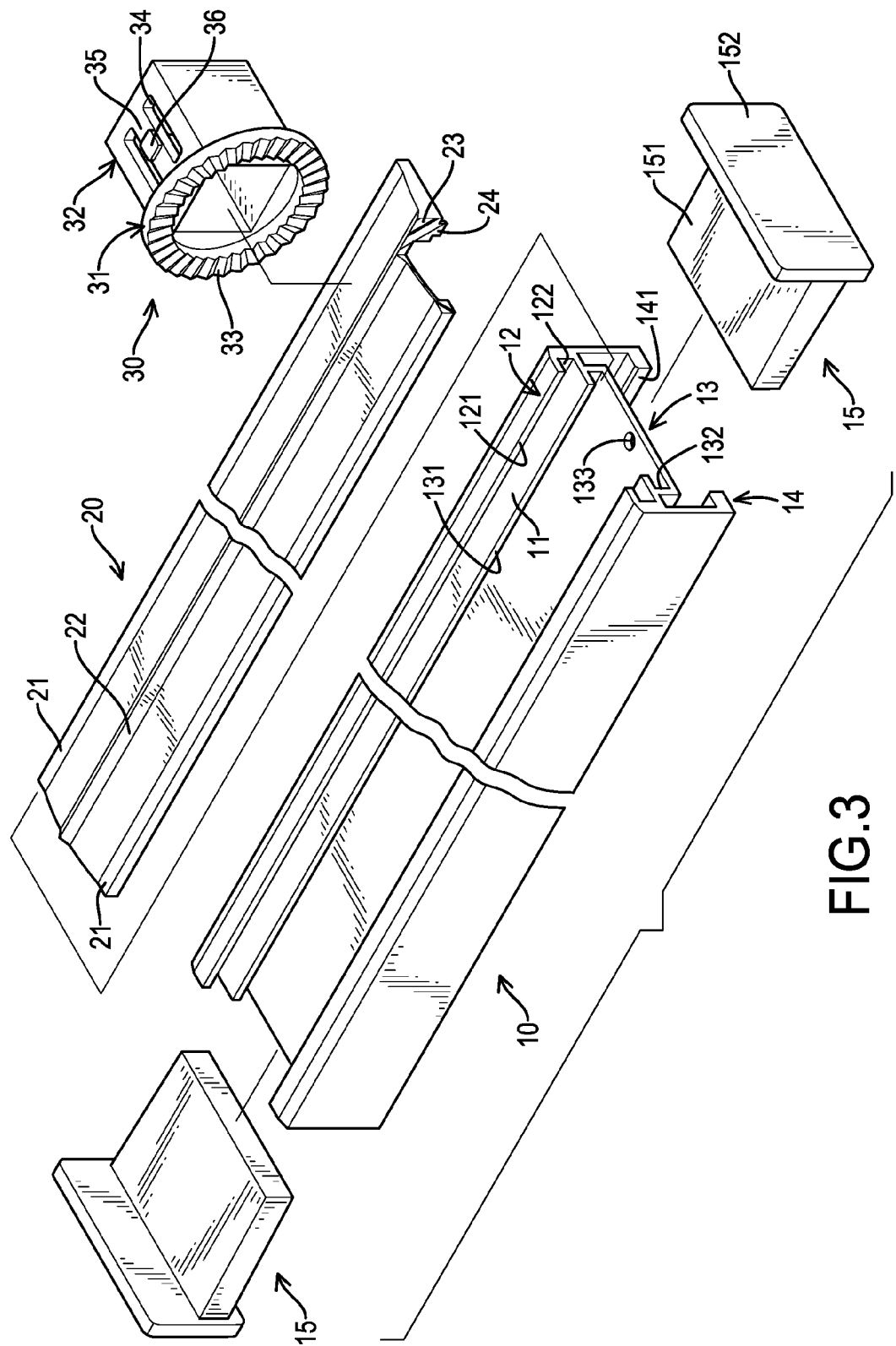
FIG. 3 is another enlarged and exploded perspective view of the sleeve bracket assembly in FIG. 1.

With reference to FIGS. 1 to 3, a sleeve bracket assembly in accordance with the present invention comprises a track-base 10, a positioning-board 20 and multiple positioning-mounts 30.

The track-base 10 is made of aluminum and has a bottom panel 11, a slide-rail 12, a connecting track 13, a closed-track 14 and two seal-blocks 15. The bottom panel 11 is elongated and has a top surface, a bottom surface and two free ends. The slide-rail 12 is formed on and protrudes from the top surface of the bottom panel 11 between the free ends of the bottom panel 11 and has a top, an upper opening 121 and a sliding recess 122. The upper opening 121 is formed through the top of the slide-rail 12. The sliding recess 122 is formed in the slide-rail 12 between the top of the slide-rail 12 and the top surface of the bottom panel 11 and communicates with the upper opening 121.

The connecting track 13 is formed on and protrudes downwardly from the bottom surface of the bottom panel 11 and has a top, a bottom, two free ends, a top opening 131, a connecting recess 132 and an engaging-hole 133. The top of the connecting track 13 is formed on and protrudes downwardly from the bottom surface of the bottom panel 11. The top opening 131 is formed through the top surface and the bottom surface of the bottom panel 11 and communicates with the sliding recess 122 of the slide-rail 12. The connecting recess 132 is formed between the bottom panel 11 and the connecting track 13 and communicates with the top opening 131. The engaging-hole 133 is formed through the bottom of the connecting track 13 adjacent to one of the free ends of the connecting track 13 and communicates with the connecting recess 132. Preferably, a width of the top opening 131 of the connecting track 13 is narrower than a width of the upper opening 121 of the slide-rail 12.

The closed-track 14 is formed on and protrudes downwardly from the bottom surface of the bottom panel 11 around the connecting track 13 and has a bottom, two free ends and a lower opening 141. Preferably, the closed-track 14 and the slide-rail 12 are formed on the bottom panel 11 as a single piece. The lower opening 141 is formed through the bottom of the closed-track 14 and communicates with the connecting recess 132 via the engaging-hole 133 of the connecting track 13.

The seal-blocks 15 are respectively connected to the free ends of the closed-track 14, and each one of the seal-blocks 15 has a mounting segment 151 and a seal segment 152. The mounting segments 151 of the seal-blocks 15 are mounted in the closed-track 14 respectively via the free ends of the closed-track 14. The seal segments 152 are respectively formed on and protrude from the mounting segments 151 and respectively abut the free ends of the bottom panel 11, the connecting track 13 and the closed-track 14 to close the sliding recess 122 of the slide-rail 12, the connecting recess 132 of the connecting track 13 and the closed-track 14.

Figure 4:
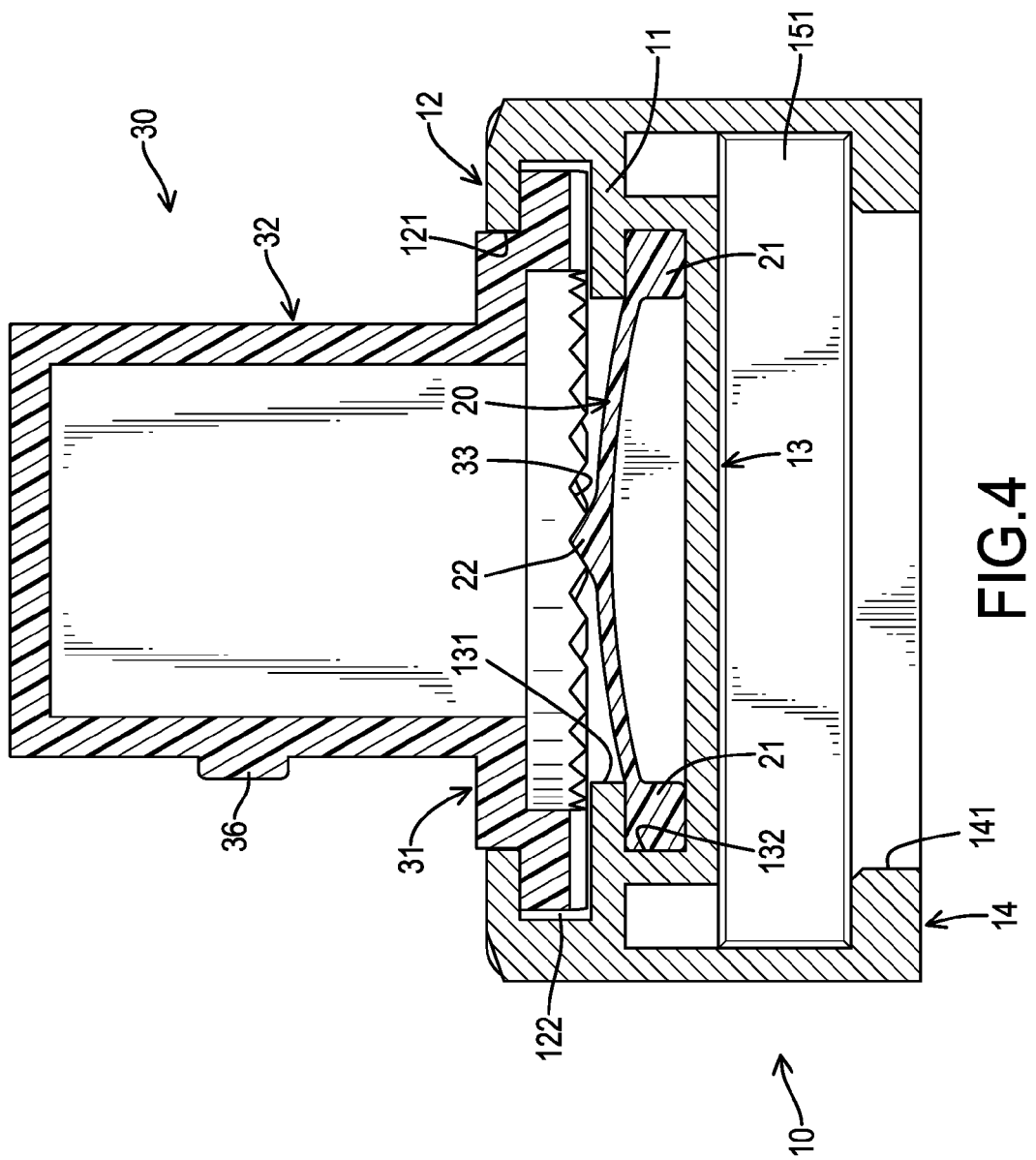
FIG. 4 is an enlarged cross sectional side view of the sleeve bracket assembly along line 4-4 in FIG. 1.
Figure 5:
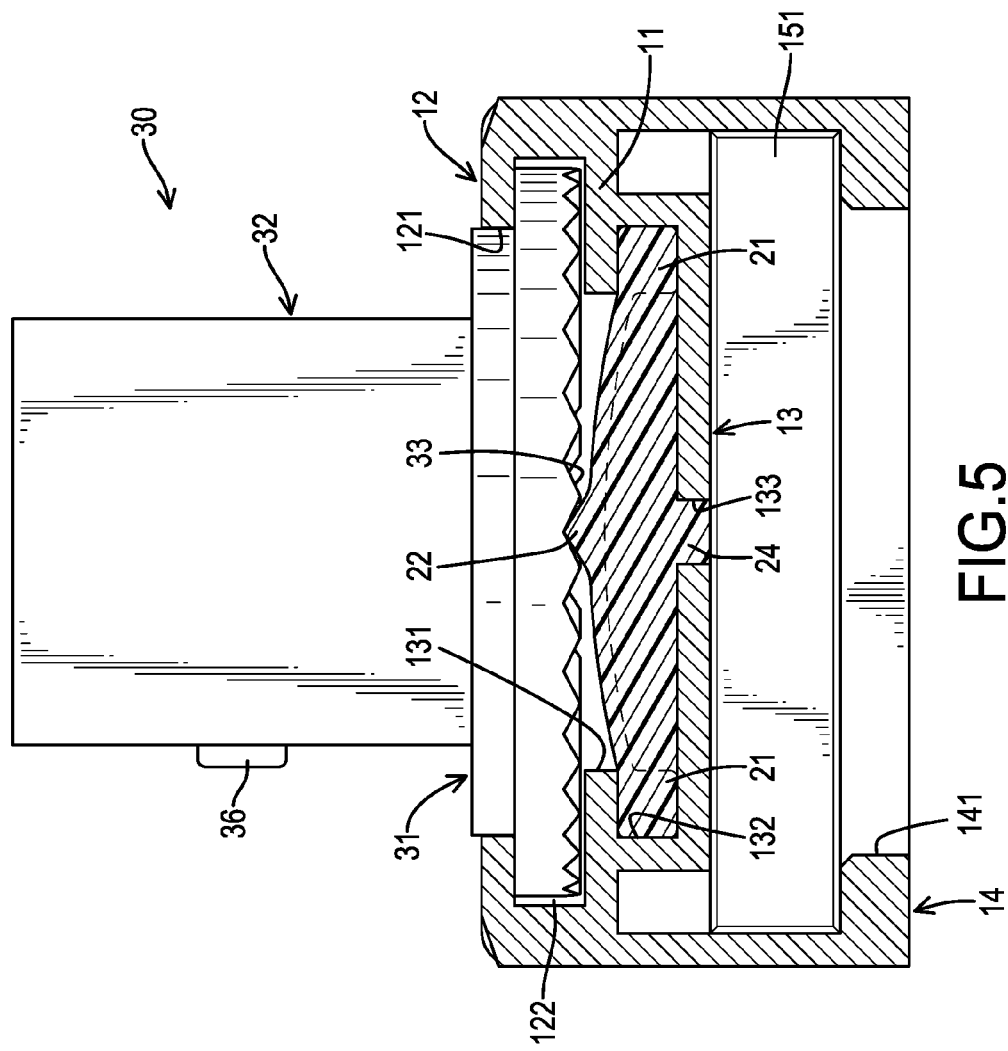
FIG. 5 is an enlarged cross sectional side view of the sleeve bracket assembly along line 5-5 in FIG. 1.

With reference to FIGS. 3, 4 and 5, the positioning-board 20 is elastic, is mounted in the connecting track 13 of the track-base 10 and has two long opposite sides, two free ends, a middle, a top surface, a bottom surface, two rail-bars 21, a positioning-rack 22, a thickening-block 23 and an engaging protrusion 24. The positioning-board 20 is bent upwardly from the long opposite sides of the positioning-board 20 to the middle of the positioning-board 20. Then, the top surface of the positioning-board 20 at the middle of the positioning-board 20 extends at the top opening 131 of the connecting track 13.

The rail-bars 21 are respectively formed on and protrude outwardly from the long opposite sides of the positioning-board 20 and are mounted in the connecting recess 132 of the connecting track 13. The positioning-rack 22 is formed on and protrudes upwardly from the top surface of the positioning-board 20 at the middle of the positioning-board 20 between the free ends of the positioning-board 20, is parallel with the long opposite sides of the positioning-board 20 and extends in the sliding recess 122 of the slide-rail 12.

The thickening-block 23 is formed on and protrudes downwardly from the bottom surface of the positioning-board 20 at one of the free ends of the positioning-board 20 that is adjacent to the engaging-hole 133 of the connecting track 13 and has a bottom and a middle. The engaging protrusion 24 is formed on and protrudes downwardly from the bottom of the thickening-block 23 at the middle of the thickening-block 23 and engages the engaging-hole 133 when the positioning-board 20 is mounted in the connecting recess 132 of the connecting track 13. Then, the positioning-board 20 can be securely mounted in the connecting track 13 by the engagement between the engaging-hole 133 and the engaging protrusion 24.

The positioning-mounts 30 are movably and rotatably mounted on the track-base 10, engage the positioning-board 20 and each one of the positioning-mounts 30 has a sliding-engaging seat 31 and an inserting-button 32. The sliding-engaging seat 31 is round, is movably mounted in the sliding recess 122 of the slide-rail 12 and engages the positioning-board 20. The sliding-engaging seat 31 has a top surface, a bottom surface and at least three engaging-teeth 33. The top surface of the sliding-engaging seat 31 faces the upper opening 121 of the slide-rail 12. The bottom face of the sliding-engaging seat 31 faces the top opening 131 of the connecting track 13. The at least three engaging-teeth 33 are annularly formed on and protrude from the bottom surface of the sliding-engaging seat 31 and selectively engage the positioning-rack 22 of the positioning-board 20.

Furthermore, when two of the at least three engaging-teeth 33 are mounted between the positioning-rack 22, the sliding-engaging seat 31 can be moved relative to the connecting track 13 along the long opposite sides of the positioning-board 20 and this can provide a guiding effect to the sliding-engaging seat 31. In addition, when the at least three engaging-teeth 33 of the sliding-engaging seat 31 engage the positioning-rack 22 of the positioning-board 20, the sliding-engaging seat 31 is held on the positioning-board 20 and cannot be rotated relative to the track-base 10, and this can provide a positioning effect to the sliding-engaging seat 31. Preferably, the sliding-engaging seat 31 of each one of the positioning-mounts 30 has multiple engaging-teeth 33 annularly formed on the bottom surface of the sliding-engaging seat 31.

The inserting-button 32 is hollow, is formed on and protrudes upwardly from the top surface of the sliding-engaging seat 31 and extends out of the upper opening 121 of the slide-rail 12. The inserting-button 32 is rectangular and has a side surface, two slits 34, a resilient section 35 and a protruding segment 36. The slits 34 are formed through the side surface of the inserting-button 32 and are parallel with each other at an interval. The resilient section 35 is formed on the side surface of the inserting-button 32 between the slits 34 to enable the resilient section 35 to deform relative to the side surface of the inserting-button 32 and has a central segment. The protruding segment 36 is formed on and protrudes outwardly from the central segment of the resilient section 35.

Figure 6:
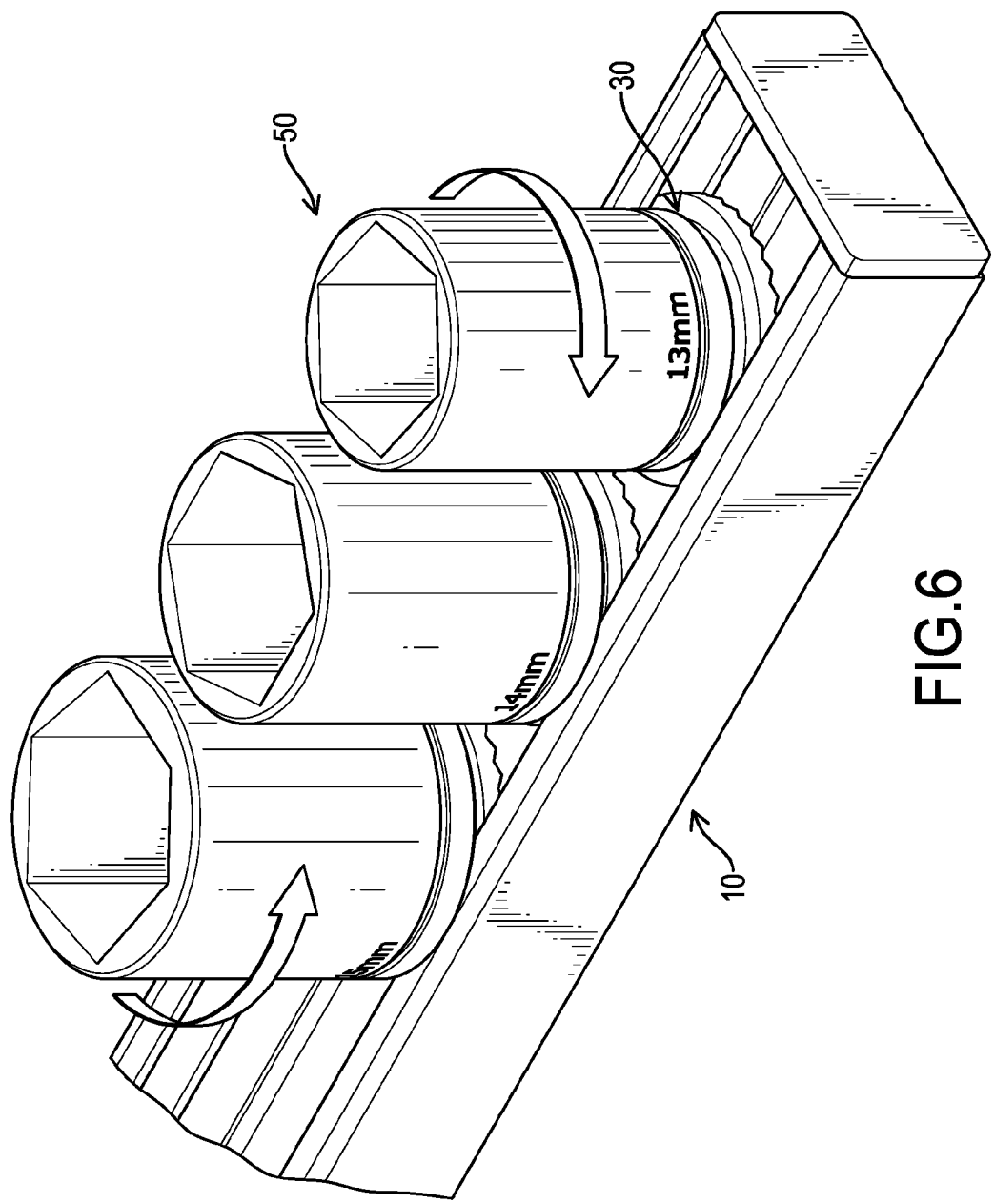
FIG. 6 is an enlarged operational view of the sleeve bracket assembly in FIG. 1, connected with sleeves.
Figure 7:
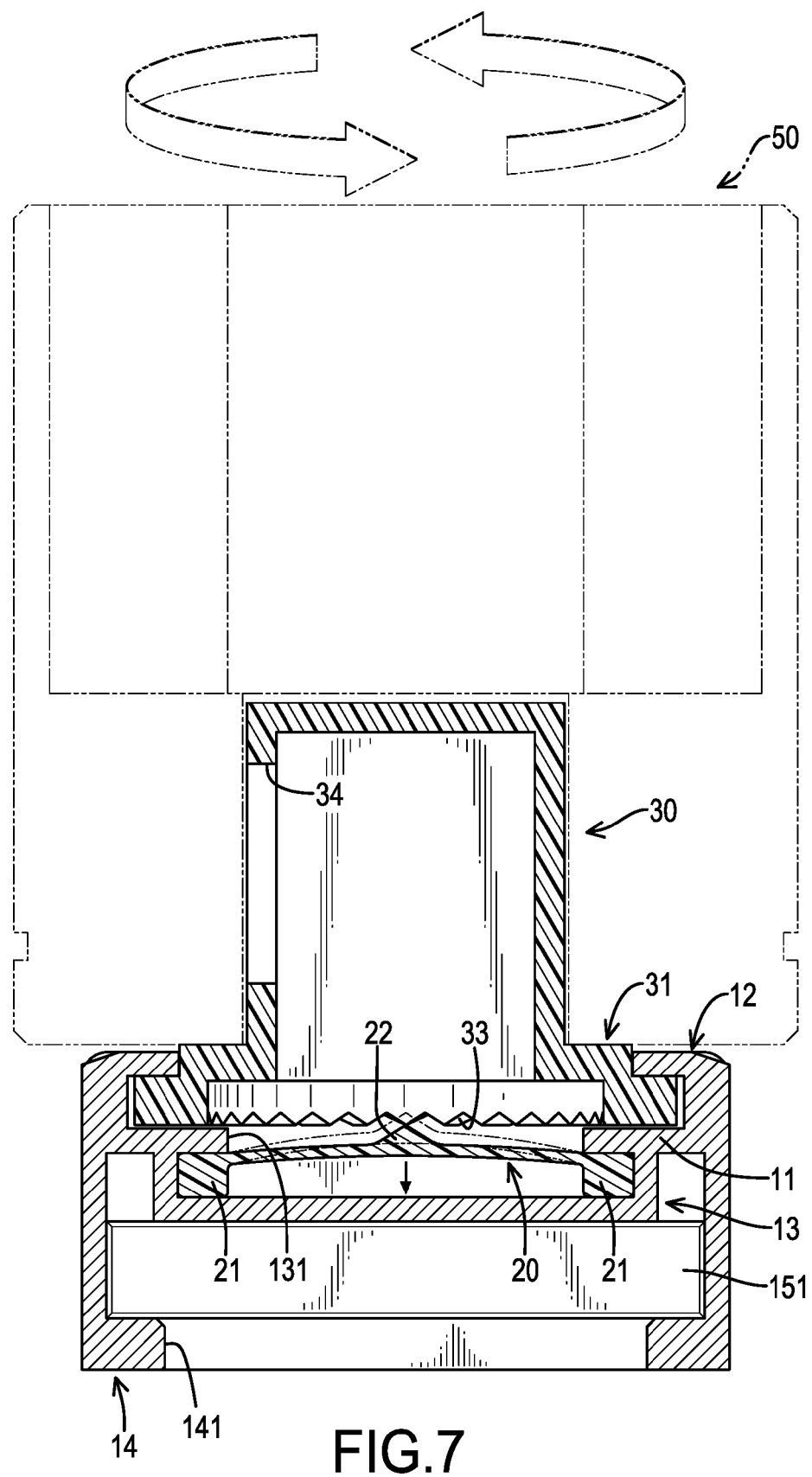
FIG. 7 is an enlarged and operational cross sectional side view of the sleeve bracket assembly in FIG. 4.

With reference to FIGS. 4 and 6, in use, sleeves 50 are respectively and detachably mounted around the inserting-buttons 32 of the positioning-mounts 30. When each sleeve 50 is mounted around the inserting-button 32 of a corresponding positioning mount 30, the resilient section 35 of the inserting-button 32 is bent inwardly by an inner surface of the sleeve 50. Consequently, the resilient section 35 recovers and the protruding segment 36 is embedded in a recess of the inner surface of the sleeve 50 to position the sleeve 50. Accordingly, the sleeve bracket assembly in accordance with the present invention can position the sleeves 50 securely on the positioning-mounts 30. If a number or a sign on the sleeve 50 is not face a user, with reference to FIGS. 4 and 7, the user can rotate the sleeve 50 relative to the track-base 10 in a clockwise direction or a counterclockwise direction according to the position of the number or sign on the sleeve 50. Since the sleeve 50 is securely mounted around the inserting-button 32 of the positioning mount 30, the sliding-engaging seat 31 is rotated with the inserting-button 32 and the sleeve 50 relative to the positioning-board 20. Then, the at least three engaging-teeth 33 are moved relative to the positioning-rack 22 and are press against the positioning-rack 22, and this will enable the middle of the positioning-board 20 to deform downwardly relative to the positioning mount 30.

When the sleeve 50 is rotated to enable the number or sign on the sleeve 50 to face the user, the user can release the sleeve 50 and the positioning mount 30 can be securely held on the track-base 10 between the slide-rail 12 and the positioning-board 20 by the engagement between the positioning-rack 22 and the at least three engaging-teeth 33. Then, the sleeve 50 that is securely mounted around the inserting-button 32 of the positioning mount 30 can be securely mounted on the track-base 10 when hitting by other objects. Therefore, the user will not need to rotate the sleeves 50 relative to the inserting-buttons 32 to adjust the positions and the angles of the numbers or signs of the sleeves 50 and this is convenient in use.

Furthermore, the engagement between the at least three engaging-teeth 33 of the sliding-engaging seat 31 and the positioning-rack 22 of the positioning-board 20 not only can provide a positioning effect to the positioning mount 30, but also can provide a guiding-moving effect to the positioning mount 30. Additionally, in assemble, when the positioning-board 20 is moved relative to the track-base 10 to mount in the connecting track 13, the positioning-board 20 can be securely mounted in the connecting track 13 by the engagement between the engaging-hole 133 and the engaging protrusion 24 as shown in FIG. 5 without using fasteners. Moreover, the seal-blocks 15 are respectively connected to the free ends of the closed-track 14 to close the sliding recess 122 of the slide-rail 12, the connecting recess 132 of the connecting track 13 and the closed-track 14. Then, the positioning-mounts 30 and the positioning-board 20 can be held on the track-base 10 without separating from the track-base 10 via the slide-rail 20 and the connecting track 13.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A sleeve bracket assembly comprising:
   a track-base having
      a bottom panel being elongated and having a top surface, a bottom surface and two free ends;
      a slide-rail formed on and protruding from the top surface of the bottom panel between the free ends of the bottom panel and having
         a top;
         an upper opening formed through the top of the slide-rail; and
         a sliding recess formed in the slide-rail between the top of the slide-rail and the top surface of the bottom panel and communicating with the upper opening; and
      a connecting track formed on and protruding downwardly from the bottom surface of the bottom panel and having
         a top formed on and protruding downwardly from the bottom surface of the bottom panel;
         a bottom;
         two free ends;
         a top opening formed through the top surface of the bottom panel and the bottom surface of the bottom panel and communicating with the sliding recess of the slide-rail; and
         a connecting recess formed between the bottom panel and the connecting track and communicating with the top opening;
   a positioning-board being elastic, mounted in the connecting track of the track-base and having
      two long opposite sides;
      two free ends;
      a middle;
      a top surface;
      a bottom surface;
      two rail-bars respectively formed on and protruding outwardly from the long opposite sides of the positioning-board and mounted in the connecting recess of the connecting track;
      wherein the positioning-board being bent upwardly from the long opposite sides of the positioning-board to the middle of the positioning-board to enable the top surface of the positioning-board at the middle of the positioning-board to extend at the top opening of the connecting track; and
      a positioning-rack formed on and protruding upwardly from the top surface of the positioning-board at the middle of the positioning-board between the free ends of the positioning-board, being parallel with the long opposite sides of the positioning-board and extending in the sliding recess of the slide-rail; and
   multiple positioning-mounts movably and rotatably mounted on the track-base, engaging the positioning-board and each one of the positioning-mounts having
      a sliding-engaging seat being round, movably mounted in the sliding recess of the slide-rail and engaging the positioning-board and having
         a top surface facing the upper opening of the slide-rail;
         a bottom surface facing the top opening of the connecting track; and
         at least three engaging-teeth annularly formed on and protruding from the bottom surface of the sliding-engaging seat and selectively engaging the positioning-rack of the positioning-board; and
      an inserting-button being rectangular and formed on and protruding upwardly from the top surface of the sliding-engaging seat and extending out of the upper opening of the slide-rail.

2. The sleeve bracket assembly as claimed in claim 1, wherein
   the connecting track has an engaging-hole formed through the bottom of the connecting track adjacent to one of the free ends of the connecting track and communicating with the connecting recess; and
   the positioning-board has
      a thickening-block formed on and protruding downwardly from the bottom surface of the positioning-board at one of the free ends of the positioning-board that is adjacent to the engaging-hole of the connecting track and having a bottom and a middle; and
      an engaging protrusion formed on and protruding downwardly from the bottom of the thickening-block at the middle of the thickening-block and engaging the engaging-hole when the positioning-board is mounted in the connecting recess of the connecting track.

3. The sleeve bracket assembly as claimed in claim 2, wherein the track-base has
   a closed-track formed on and protruding downwardly from the bottom surface of the bottom panel around the connecting track and having
      a bottom;
      two free ends; and
      a lower opening formed through the bottom of the closed-track and communicating with the connecting recess via the engaging-hole of the connecting track; and
   two seal-blocks respectively connected to the free ends of the closed-track.

4. The sleeve bracket assembly as claimed in claim 3, wherein each one of the seal-blocks has
   a mounting segment mounted in the closed-track via one of the free ends of the closed-track; and
   a seal segment formed on and protruding from the mounting segment to close the sliding recess of the slide-rail, the connecting recess of the connecting track and the closed-track.

5. The sleeve bracket assembly as claimed in claim 1, wherein the inserting-button of each one of the positioning-mounts has
- a side surface;
- two slits formed through the side surface of the inserting-button and parallel with each other at an interval;
- a resilient section formed on the side surface of the inserting-button between the slits to enable the resilient section to deform relative to the side surface of the inserting-button and having a central segment; and
- a protruding segment formed on and protruding outwardly from the central segment of the resilient section.

6. The sleeve bracket assembly as claimed in claim 2, wherein the inserting-button of each one of the positioning-mounts has
- a side surface;
- two slits formed through the side surface of the inserting-button and parallel with each other at an interval;
- a resilient section formed on the side surface of the inserting-button between the slits to enable the resilient section to deform relative to the side surface of the inserting-button and having a central segment; and
- a protruding segment formed on and protruding outwardly from the central segment of the resilient section.

7. The sleeve bracket assembly as claimed in claim 3, wherein the inserting-button of each one of the positioning-mounts has
- a side surface;
- two slits formed through the side surface of the inserting-button and parallel with each other at an interval;
- a resilient section formed on the side surface of the inserting-button between the slits to enable the resilient section to deform relative to the side surface of the inserting-button and having a central segment; and
- a protruding segment formed on and protruding outwardly from the central segment of the resilient section.

8. The sleeve bracket assembly as claimed in claim 4, wherein the inserting-button of each one of the positioning-mounts has
- a side surface;
- two slits formed through the side surface of the inserting-button and parallel with each other at an interval;
- a resilient section formed on the side surface of the inserting-button between the slits to enable the resilient section to deform relative to the side surface of the inserting-button and having a central segment; and
- a protruding segment formed on and protruding outwardly from the central segment of the resilient section.

\* \* \* \* \*